May 4, 1943. G. W. DUNHAM Re. 22,307
WASHING MACHINE
Original Filed July 24, 1936 2 Sheets-Sheet 1
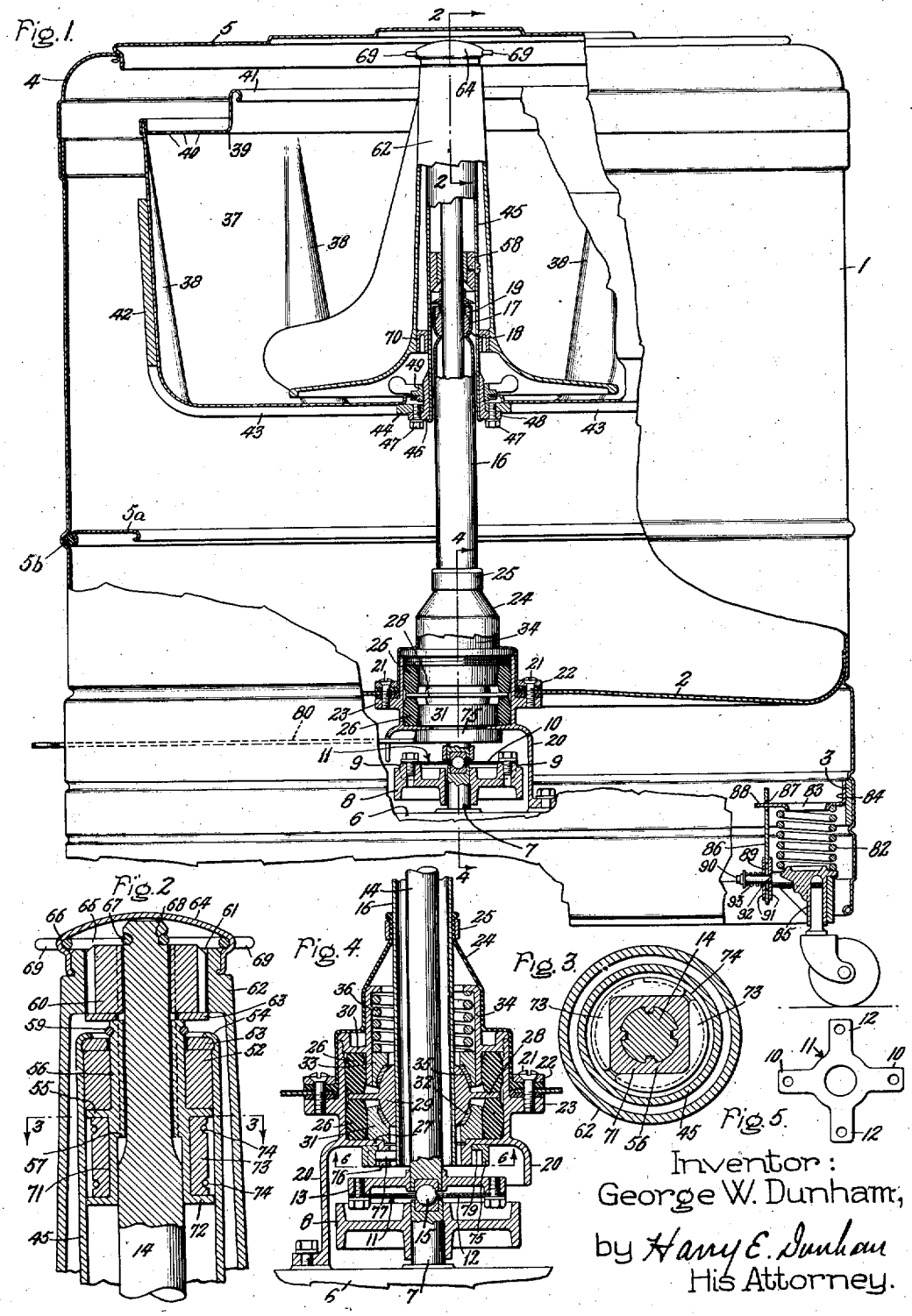
Inventor:
George W. Dunham,
by Harry E. Dunham
His Attorney.

May 4, 1943. G. W. DUNHAM Re. 22,307

WASHING MACHINE

Original Filed July 24, 1936 2 Sheets-Sheet 2

Inventor
George W. Dunham,
by Harry E. Dunham
His Attorney.

Reissued May 4, 1943

Re. 22,307

UNITED STATES PATENT OFFICE 22,307

WASHING MACHINE

George W. Dunham, Westport, Conn., assignor to General Electric Company, a corporation of New York Original No. 2,275,846, dated March 10, 1942, Serial No. 92,373, July 24, 1936. Application for reissue May 20, 1942, Serial No. 443,763

14 Claims. (Cl. 68—23)

The present invention relates to washing machines of the type having a centrifugal extractor for drying the clothes.

The object of my invention is to provide an improved construction and arrangement in washing machines of this type and, for a consideration of what I believe to be novel and my invention, attention is directed to the accompanying description and the claims appended thereto.

Figure 11:
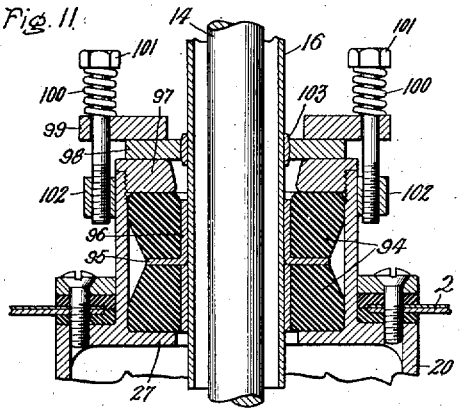
Figure 7:
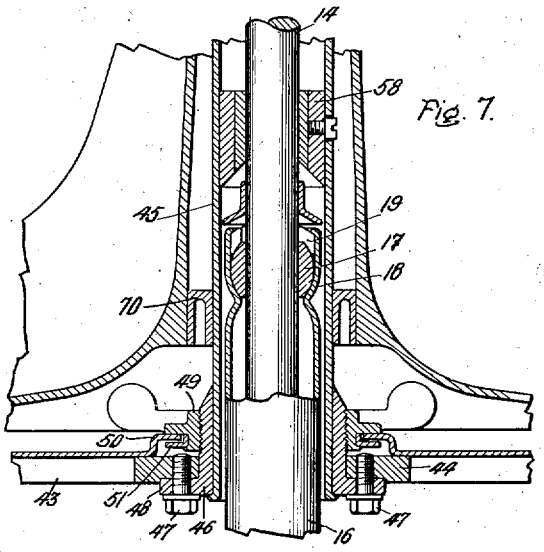
Figure 6:
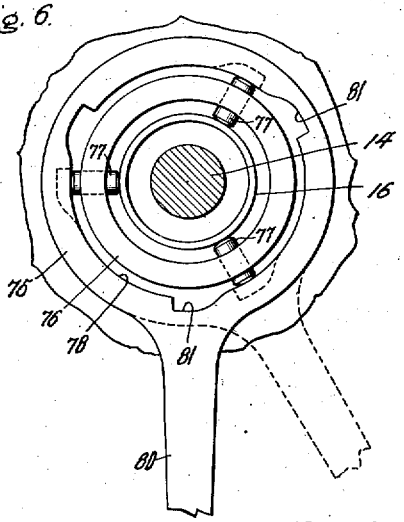
Figure 8:
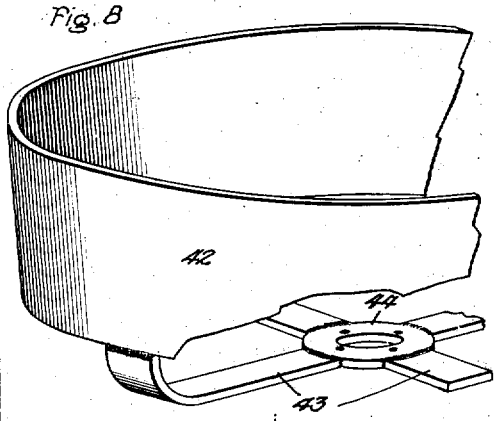
Figure 10:
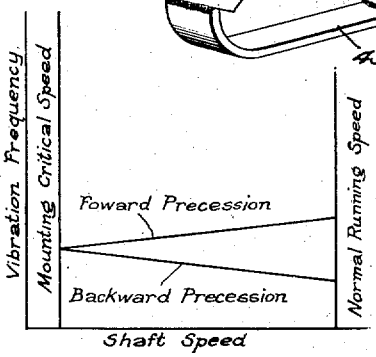
Figure 9:
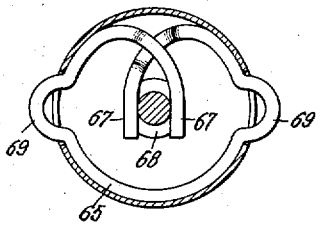

In the accompanying drawings, Fig. 1 is a sectional elevation, partly broken away, of a washing machine embodying my invention; Fig. 2 is an enlarged sectional view taken on line 2—2 of Fig. 1 showing the arrangement for driving the agitator and the rotatable receptacle; Fig. 3 is a sectional view taken on line 3—3 of Fig. 2; Fig. 4 is a sectional view taken on line 4—4 of Fig. 1; Fig. 5 is a top plan view of the universal joint used to transmit power to the shaft for driving the rotatable receptacle; Fig. 6 is a sectional view taken on line 6—6 of Fig. 4; Fig. 7 is an enlarged view of the portion of Fig. 1 showing the manner of securing the rotatable receptacle to the carrier; Fig. 8 is a fragmentary perspective view of the carrier for the rotatable receptacle; Fig. 9 is a sectional plan view of the upper end of the agitator showing the arrangement for holding the agitator on the vertical shaft; Fig. 10 is the plot showing the frequencies of precession of the rotatable receptacle; and Fig. 11 is a sectional elevation of a modification of the arrangement for damping precession of the rotatable receptacle.

The washing machine has a stationary tub which comprises a cylindrical casing 1 at the bottom of which is soldered a head 2. A stiffening ring 3 is fixed to the inside of the casing below the head 2, so that the depending sides of the casing serve as a base. The upper end of the tub is partially closed by an annular cover 4 which fits within the upper edge of the casing 1. The closure of the top of the stationary tub is completed by a cover 5 which rests on the inner edge of the annular cover 4. A splash ring $5^a$ is secured to the casing by a rubber bead $5^b$.

The driving mechanism for the washing machine is carried in a housing 6 suitably supported by the stiffening ring 3. This driving mechanism, which is adapted to effect selective oscillation or rotation of a vertical shaft 7, may be of any suitable type, for example, the driving mechanism shown in my Patent Number 2,161,618, issued June 6, 1939. Keyed to the shaft 7 is a brake drum 8 having diametrically opposed bosses 9 to which are bolted arms 10 of a universal joint 11. The arms 12 of the universal joint are bolted to bosses 13 on a bracket secured to a vertical shaft 14. The gravity thrust of the vertical shaft 14 is transmitted to the shaft 7 through a ball thrust bearing 15. With this arrangement the universal joint does not have to withstand any of the gravity thrust, and the friction of the universal joint, which tends to cause shaft whip or in other words forward precession of the shaft, is decreased. With this construction it is possible to use a simple universal joint of the type shown, which may consist merely of a piece of sheet steel provided with two pairs of arms which are connected respectively to the driving and driven shafts. The arms of the universal joint are sufficiently flexible so that the vertical shaft 14 may have a gyratory movement with respect to the driving shaft 7. The friction in the universal joint is further decreased by the use of metal which has low internal friction compared to fabric.

The vertical shaft 14 extends through a sleeve 16, the upper end of which is above the normal water level in the stationary tub. The upper end of the sleeve is provided with a spherical seat for a self-lubricating bearing 17 which guides the shaft 14. This spherical seat comprises a flared portion 18 of the sleeve and a collar 19 which is secured in the upper end of the sleeve. The spherical seat permits alignment of the bearing 17 with the shaft 14, so that the bearing pressure is uniform regardless of the inclination of the shaft.

The housing 6 for the driving mechanism has fixed thereto a hollow post 20 which extends through a central opening in the head 2 forming the bottom wall of the stationary tub. The post 20 is secured to the bottom wall of the tub by means of screws 21 which are threaded through a clamping ring 22 into a flange 23 on the post. Leakage from the bottom of the tub is prevented by means of a rubber sleeve 24 which has its lower edge clamped between the clamping ring 21 and the bottom of the tub and has its upper edge clamped to the sleeve 16 by means of a clamp 25.

Within the post 20 is a resilient mounting for the lower end of the sleeve 16 which comprises two cushioning rings 26 of rubber or other resilient material. The lower ring is arranged between an inwardly extending flange 27 at the lower end of the post and a flange 28 projecting from a spherical collar 29 fixed to the sleeve 16. The upper ring 26 is arranged between the upper side of the flange 28 and a nut 30 which is threaded into the upper end of the post 20. The nut 30 varies the compression of the rubber and thereby varies the stiffness of the mounting. With this mounting the sleeve 16 is resiliently held in a central position and is free to tilt in all directions in order that the shaft 14 may have a gyratory movement about the driving shaft 7.

The gyratory movement of the shaft 14 is damped by friction members bearing on the spherical collar 29. The lower friction member comprises a ring 31 seated on the inner edge of the flange 27. The outer edge of the ring 31 bears against the inner edge of the lower cushioning ring 26, and the inner edge of the ring 31 is provided with a spherical seat carrying friction material 32 which bears on the spherical collar 29. The upper friction member comprises a ring 33 slidably carried in a sleeve 34 integral with the nut 30. The ring 33 likewise has a spherical seat carrying friction material 35 which bears on the upper side of the spherical collar 29. The outer edge of the sleeve 34 bears against the inner edge of the upper cushioning ring 26. The pressure between the friction material 32 and 35 and the spherical surface of ring 29 is determined by a coil spring 36 which presses against the upper edge of the ring 33. Since the ring 33 is slidable in the sleeve 34 the pressure on the spring 36 is not transmitted to the rubber rings 26 and therefore does not effect the resilient mounting for the sleeve 16. Also, the pressure exerted on the friction material is not affected by the inclination of the shaft 14. The friction members obviously resist tilting of the shaft 14.

In the upper part of the stationary tub is a rotatable tub or receptacle 37 for receiving liquid and material to be washed. The space between the bottom of the receptacle and the bottom of the stationary tub is sufficient to provide a storage space for all the liquid which can be placed in the receptacle. The receptacle is made of relatively thin and non-corrosive metal, such as aluminum, so that it is quite light. The side walls of the receptacle are imperforate and are tapered so that, as the receptacle is rotated, liquid will be discharged over its upper edge. The side walls of the receptacle are provided with vanes 38 which increase the friction between the liquid and the receptacle at the start of the extracting operation, so that the liquid will be more quickly expelled from the receptacle. At the upper edge of the receptacle is an annular guard ring 39 which keeps the clothes within the receptacle during washing and extracting. The guard ring is provided with perforations 40 through which the liquid is discharged. The top inner edge of the guard ring is provided with a beaded flange 41 which presents a smooth surface to the clothes when loading and unloading, and provides a grip for the lifting of the receptacle.

The receptacle is supported on a carrier (see Fig. 8) having annular reinforcing walls 42 surrounding the side walls of the receptacle and having spaced radial arms 43 connecting the walls 42 to a disk 44 to which is secured a hub 45. The manner of securing the hub to the disk 44 is shown in Fig. 7. In this arrangement a sleeve 46 is suitably fixed to the lower end of the hub, and screws 47 are threaded through a flange 48 on the sleeve into tapped holes in the disk 44. The receptacle is secured to the carrier by means of a wing nut 49 threaded on the sleeve 46 which engages a flange 50 on the receptacle. The nut is provided with a flange 51 which extends underneath the flange 50. The purpose of the flange 51 is to lift the receptacle from the carrier when the nut is unthreaded. This insures the easy release of the receptacle from the carrier.

With this construction the carrier is not subject to the corrosive action of the washing solution and can therefore be made of a relatively cheap material, such as galvanized steel or cast iron, while the receptacle, which must be made of relatively expensive non-corrosive material, can be very light. The receptacle can therefore be easily removed for cleaning. Another advantage of this construction is that the spacing of the arms 43 to the carrier is sufficient to permit easy access to the bottom and side walls of the stationary tub when the receptacle 37 is removed. This facilitates the cleaning of the tub. Another advantage of this construction is that the annular reinforcing walls 42, which are relatively heavy, increase the mass of the receptacle and thereby diminish the amplitude of gyration due to unbalanced distribution of load within the receptacle.

The carrier is supported on the upper end of the vertical shaft 14 by a combined sleeve and thrust bearing 52 which is held in the upper end of the hub 45 by a washer 53 arranged between the bearing and a spun-over portion 54 of the hub. The lower edge of the bearing 52 bears on a flange 55 of a sleeve 56 which is splined on the shaft 14. The inner surface of the bearing 52 bears on the sleeve 56. The weight of the carrier and receptacle is transmitted from the bearing 52 through the flange 56 to a shoulder 57 on the shaft 14, and from the shaft 14 through the ball thrust bearing 15 to the shaft 7 which may be provided with an easily lubricated thrust bearing in the housing 6. The lower end of the hub 45 is guided on the shaft 14 by a sleeve bearing 58 secured to the inside of the hub. With this arrangement the carrier and receptacle are rotatably supported on the shaft 14, and the shaft 14 is normally free to rotate relative to the hub 45. When the carrier is removed from the shaft 14, a snap ring 59 holds the sleeve 56 and the parts assembled thereon in fixed relation to the hub 45, so that these parts are removed as a unit. This allows the bearing 58 to be of minimum diameter, thereby reducing the friction loss, and permits the whole carrier assembly to be lifted off the shaft 14 without disturbing any of the parts.

The splined end of the shaft 14 projects above the sleeve 56 and has a nut 60 fitting thereon which fits within a complementary opening 61 in the hub of an agitator 62, providing a positive driving connection for the agitator. The weight of the agitator is carried on the upper end of the sleeve 56 through a thrust washer 63. The upper end of the hub 45 and the agitator extend above the normal water level in the receptacle, but, during washing, water is sometimes splashed over the upper end of the agitator. Leakage of this water around the shaft 14 is prevented by a cap 64 secured over the upper end of the agitator. Within this cap is carried a wire spring 65 of the configuration shown in Fig. 9. This spring normally occupies the position shown in Fig. 5 in which the sides of the spring fit within a groove 66 of the cap, and in which the arms 67 of this spring fit in an annular groove 68 in the upper end of the shaft 14. When in this position, the agitator is securely held on the shaft. When the agitator is to be removed the ears 69 of the spring 65 are pressed inward, thereby spreading the arms 67 clear of the groove 68 so that the agitator may be lifted from the upper end of the shaft. The arms 67 have sufficient resilience so that they will be forced apart by the upper end of the shaft 14 when the agitator is replaced. The lower end of the agitator is guided on the hub 15 by a bearing 70.

The arrangement for connecting the shaft 6 to the receptacle during extracting is the same as that shown in my Patent Number 2,161,619, issued June 6, 1939. In accordance with this arrangement the lower end of the sleeve 56 is provided with a squared portion 71 between the flange 55 and a flange 72. Between these flanges are clutch shoes 73 which are held against the squared surface by split rings 74 when the shaft 14 is oscillated at the required speed for washing. Therefore, during this oscillation of the shaft the receptacle will not be connected to the shaft and the agitator will oscillate in the receptacle. When the clothes are to be dried the shaft 14 is rotated. As soon as the speed of rotation exceeds a few hundred R. P. M., the centrifugal force acting on the clutch shoes 73 causes the shoes to be thrown outward. When the shoes make contact with the inner surface of the hub 45 the friction between the shoes and the hub causes the shoes to be displaced relative to the squared cam surface 71. This displacement causes the shoes to be wedged between the cam surface and the hub, thereby completing a positive driving connection between the shaft and the receptacle. Similarly, when stopping the rotation of the receptacle, for example, by applying a braking force to the brake drum 8, the shoes release and immediately wedge in the opposite direction. This driving connection is dependent upon the torque transmitted through the shaft 14, so that when the torque is removed the shoes may by means of springs 74, be easily returned to their normal position against the squared surface 71.

In the use of the machine, the receptacle 37 is loaded with clothes and filled with a suitable washing solution. The driving mechanism is then adjusted so that the shaft 7 is oscillated. During this oscillation movement, the receptacle 37 remains substantially stationary due to inertia and the oscillation of the agitator relative to the receptacle causes the clothes to be washed. During the washing operation, the receptacle 37 may be tilted to one side due to the fact that the clothes are not uniformly distributed in the receptacle. During the washing operation the bearing loss in the bearings 52 and 58 is negligible due to the low speed of oscillation of the shaft 14.

Since the resilient mounting provided by the rubber rings 26 is preferably quite weak, the tilting of the receptacle may be sufficient to cause the receptacle to strike the side of the casing 1. Once in this position, the receptacle will tend to remain there due to the shifting of the liquid, and the friction between the receptacle and the casing and the resultant unbalance would greatly increase the power required for the subsequent rotation of the receptacle for extracting. In the present construction, this difficulty is avoided by holding the receptacle in a central position during washing, the holding device being released after washing and before starting to dry. The receptacle will then remain in a substantially upright position due to the friction between the collar 29 and the friction material 32 and 35 and to the absence of external force such as produced by the washing means. One arrangement for accomplishing this result comprises a collar 75 pivoted on a sleeve 76 depending from the flange 27. Three pins 77, which are slidably carried in the sleeve 76, extend radially from the sleeve 16 into a groove 78 in the collar 75. The pins 77 support the collar by engaging a flange 79 on the collar. When the collar is in the position shown in full lines in Fig. 6, there is no clearance between the pins 77, the sleeve 16, and the groove 78, and the sleeve 16 is accordingly held in a vertical position, thus preventing tilting of the receptacle during washing. During extracting, the collar 75 is moved by lever 80 to the position shown in dotted lines in Fig. 6. In this position, depressions 81 in the groove 78 provide sufficient clearance to permit inclination of the sleeve 16.

At the conclusion of the washing operation, the driving mechanism is adjusted so that the shaft 7 is rotated continuously in one direction. As soon as the speed of rotation of the shaft 7 is such the centrifugal force of the shoes exceeds that of the retaining springs, the clutch shoes 73 move outwardly under the action of centrifugal force and touch the inner surface of the hub 45. As soon as the shoes 73 contact the inner surface of the hub 45, their rotation is retarded and the squared surface 71 cooperates with the inner surface of the shoes 73 and wedges the shoes tightly against the inner surface of the hub 45. This effects a positive priving connection between the shaft 14 and the receptacle which causes the receptacle to be rotated.

Since the clothes may be nonuniformly distributed in the receptacle, the receptacle may be unbalanced. This unbalance will usually consist partially of a static unbalance which is equivalent to a single weight displaced from the axis of rotation of the receptacle and partially of dynamic unbalance which is equivalent to the couple produced by vertically spaced weights of equal size located on opposite sides of and equidistant from the axis of rotation of the receptacle. The static unbalance will tend to cause gyration of the receptacle about its axis so that the receptacle rotates about its center of mass. The dynamic unbalance will tend to cause tilting of the receptacle so as to bring the receptacle into a position in which there is no unbalanced couple. The resilient mounting provided for the lower end of the sleeve 16 permits gyration of the receptacle about its axis so that the receptacle rotates about its center of mass, neutralizing the effect of static unbalance. Since the resilient mounting has some stiffness, the gyration of the receptacle about its axis is not sufficient to permit the receptacle to rotate about its center of mass, but the resilient mounting does permit sufficient gyration of the receptacle to approximate that position so that the vibration due to static unbalance is considerably decreased. Since the sleeve bearings 52 and 58 prevent tilting of the receptacle with respect to the shaft 14, the receptacle will cause vibration due to the dynamic unbalance. This tendency of the receptacle to tilt causes heavy bearing pressure on the bearings 52 and 58, but since there is no relative rotation between the bearing surfaces of these bearings, this pressure causes no bearing loss. Most of the force due to the dynamic unbalance of the receptacle will be transmitted through the universal joint at the lower end of the shaft 14 to the shaft 7. This force is taken by the bearings in which the shaft 7 rotates. Since the bearings for the shaft 7 are a considerable distance from the receptacle 37, the force on the bearings due to the unbalanced couple is less than it would be at a point nearer the receptacle. This means that the bearing loss due to the unbalanced couple is decreased. Also, these bearings are located below the stationary tub and are therefore not subjected to the humid atmosphere within the tub and are more easily lubricated. Some of the force due to the dynamic unbalance or unbalanced couple is transmitted to the sleeve 16. However, since this sleeve is resiliently supported, these vibrations are cushioned. The cushioning action decreases the bearing pressure on the bearing 17 and thereby decreases the bearing loss.

During the rotation of the receptacle vibrations are transmitted from the receptacle through the universal joint and the sleeve 16 to the ring 3. Some of the vibrations are shaft frequency vibrations due to unbalance. These vibrations are particularly great when the speed of the shaft is such that the vibrations are resonant with the natural frequency of the mounting provided by the rubber rings 26. This vibration may be termed the critical vibration of the machine due to this mounting and the speed at which this vibration occurs may be called the mounting critical speed. It is desirable that the speed at which this vibration takes place be substantially below the normal operating speed, for example less than one-sixth of normal speed, so that the centrifugal forces due to unbalance which are proportional to the square of the speed will be relatively small and the reaction on the bearings will not produce so much friction that the receptacle can not be driven through the critical speed. In the machine illustrated, the mounting initial speed is one-fifteenth of the normal running speed. In addition to these vibrations, there may be gyroscopic vibrations which result in precession of the receptacle. Precession is a rotation of the axis of rotation of the receptacle and may be forward or backward with respect to the direction of the shaft rotation. Backward precession is due to the restoring force provided by the rubber rings 26. Forward precession may be due to internal friction in the rotating parts, such as internal friction in the shaft 14 and friction in the universal joint 11. Forward precession may also result from unbalanced application of the driving force. Since the forward precession tends to damp out backward precession, it is usually the more troublesome. Forward precession is sometimes known as "shaft whip." Both forward and backward precession are damped out by the stationary or non-rotating damping provided by the friction between the ring 29 and the friction material 32 and 35 and by the internal friction in the rubber rings 26. The forward precession will not build up if the stationary damping force is equal or greater than the force exciting the forward precession. One important characteristic of this damper is that it has no lost motion. If lost motion is present the precession builds up to such a large amplitude that a great deal more damping is required to damp it out. Another characteristic of the damper is that the damping is symmetrical with respect to the axis of the shaft 14 and is independent of inclination of the shaft 14. The frequency of precession is of the same order as the mounting critical frequency due to the mounting provided by the rubber rings 26. As the shaft speed increases above the critical speed the frequency of the forward precession increases slightly and the frequency of the backward precession decreases slightly, both changes being substantially in proportion to the change in speed. Fig. 10 is a plot showing the precession frequencies. The gyroscopic vibrations may be of large amplitude. The gyroscopic vibrations always occur at shaft speeds above the mounting critical speed. Due to the time required for the gyroscopic vibrations to build up, the gyroscopic vibrations are usually important only near the normal running speed.

At normal running speed, the transmission to the floor of vibrations due to unbalance may be decreased by means of a resilient support between the floor and the machine. However, a resilient support which will decrease the transmission to the floor of the vibrations due to unbalance at normal running speed is relatively ineffective to decrease the amplitude of the larger amplitude vibrations due to the mounting critical speed or to gyroscopic vibrations. These large amplitude vibrations may be of such magnitude as to cause the receptacle to strike against the tub and damage the machine. The reaction produced on the bearings by the critical vibrations due to the mounting may be sufficiently large to prevent bringing the receptacle up to its normal operating speed. It is therefore desirable that some means be provided for damping these large amplitude vibrations. This damping should be relatively ineffective for vibration of small amplitudes so that it will not increase the transmission of these vibrations.

A supporting arrangement which will decrease the transmission of the vibrations due to unbalance at normal running speed and which will damp the larger amplitude vibrations is shown in Fig. 1. In this arrangement, a plurality of springs 82 are arranged between seats 83 or brackets 84 secured to ring 3 and on caster brackets 85. These springs are chosen so that the natural frequency of the machine on the springs does not correspond with any frequency of precession. It is generally preferable to have this natural frequency above the precession frequencies. These springs are arranged at the outer edge of the machine and are resilient in all directions so that the horizontal and vertical components of vibration are cushioned. In parallel with the springs 82 are friction damping means comprising links 86 having a slot 87 fitting over tongues 88 on brackets 84 and having slots 89 fitting over studs 90 on caster brackets 85. On the studs 90 on each side of the links 86 are washers 91 which are arranged between shoulders 92 and a coil spring 93. Damping is provided by the friction between the links 86 and the washers 91. Due to the lost motion connections between the tongues 88 and the links 86, the damping is effective only for vibrations of large amplitude. During the operation of the machine, the machine has a rocking vibration on the springs 82 which comprises horizontal and vertical components. Due to the connection between the ears 88 and the links 86, only the vertical component of vibration is damped. This is the principal component of vibration transmitted to the floor. It is important that the damping means be unaffected by the horizontal component of vibration since any resistance offered to horizontal vibration will produce a reaction which will increase the transmission of the vertical vibration. It is also important that the damping means be substantially unaffected by small amplitude vertical vibrations. Another characteristic of this damping arrangement is that it is not affected by the weight of the machine since the slots 89 in links 86 permit the links to assume a position which corresponds to the deflection of the springs 82 under the weight of the machine. When the weight of the machine is removed from the springs 82, for example during shipping, the links 86 hold the springs under tension so that they remain in place.

In Fig. 11 is shown another arrangement for damping precession. As in the previous construction, the resilient mounting for the sleeve 16 is provided by rubber cushioning rings 94, the lower ring being arranged between the flange 27 on the post 20 and a flange 95 on a sleeve 96 secured to the sleeve 16, and the upper ring being arranged between the upper side of the flange 95 and a nut 97 threaded into the upper end of the post 20. Friction damping is provided by a disk 98 which is pressed against the upper edge of nut 97 by a disk 99. The pressure on the disk 99 is obtained from springs 100 arranged between the disk 98 and the heads of screws 101 threaded into lugs 102 on the outside of the post 20. The disk 98 is provided with a spherical seat for a spherical surfaced collar 103 fixed to the sleeve 16 so that there is no lost motion between the sleeve 16 and the disk 98. This damping arrangement is also independent of the resilient mounting for the sleeve 16, that is, the friction damping is independent of the inclination of the sleeve 16.

What I claim as new and desire to secure by Letters Patent of the United States is:

1. In a washing machine having a tub, a rotatable receptacle in the tub for receiving liquid and material to be washed, means including a vertical sleeve extending upward from the bottom of the tub for supporting the receptacle, washing means in said tub, shaft means extending through said sleeve for operating said washing means and for rotating said receptacle to extract liquid from the material contained therein, means for resiliently supporting said sleeve for gyratory movement relative to the tub, said supporting means being sufficiently resilient so that the sleeve will tend to assume a tilted position during washing, and stabilizing means engaging said sleeve for decreasing the tendency of said sleeve to tilt during washing.

2. In a washing machine having a tub, a rotatable receptacle in the tub for receiving liquid and material to be washed, means including a vertical sleeve extending upward from the bottom of the tub for supporting the receptacle, washing means in said tub, shaft means extending through said sleeve for operating said washing means and for rotating said receptacle to extract liquid from the material contained therein, means for resiliently supporting said sleeve for gyratory movement relative to the tub, said supporting means being sufficiently resilient so that the sleeve will tend to assume a tilted position during washing, members engaging said sleeve, and means preventing radial movement of said members for holding said sleeve vertical during washing.

3. In a washing machine having a tub, a rotable receptacle in the tub for receiving liquid and material to be washed, means including a vertical sleeve extending upward from the bottom of the tub for supporting the receptacle, washing means in said receptacle, shaft means extending through said sleeve for operating said washing means and for rotating said receptacle to extract liquid from the material contained therein, means for resiliently supporting said sleeve for gyratory movement relative to the tub, said supporting means being sufficiently resilient so that the sleeve will tend to assume a tilted position during washing, a sleeve surrounding said first sleeve, radially extending members slidable in said second sleeve, and a collar surrounding said members and having parts movable into and out of a position engaging said members for preventing radial movement of said members and thereby holding said first sleeve vertical during washing 4. In a combined washing and drying machine, a vertical shaft, a receptacle for receiving liquid and material to be washed supported on and adapted to be rotated by said shaft, means for agitating liquid in said receptacle for washing purposes, a sleeve in which said shaft is journaled, a member on said sleeve having a spherical surface and a flange projecting therefrom, cushioning members engaging said flange for resiliently resisting tilting of the sleeve and thereby resiliently centering the sleeve in an upright position, and friction members bearing on said spherical surface for resisting tilting of the sleeve and thereby preventing precession of the receptacle.

5. In a combined washing and drying machine, a receptacle for receiving material to be washed, means supporting the receptacle for rotation on a vertical axis, means for effecting washing in the receptacle and for rotating the receptacle at a speed above its critical speed to centrifugally extract liquid from the material contained therein, supporting means for resiliently resisting tilting of the axis of rotation of the receptacle whereby the receptacle may have a gyratory movement on a vertical axis during extracting, said supporting means being sufficiently resilient so that the receptacle tends to assume a tilted position during washing, means for holding the receptacle in a central position during washing, said holding means releasable during extracting, and friction damping means acting through said supporting means for resisting said tilting of the axis of rotation of the receptacle.

6. In a combined washing and drying machine, a receptacle for receiving material to be washed, bearing means in which the receptacle is journaled for rotation on a vertical axis, means for effecting washing in the receptacle and for rotating the receptacle at a speed above its critical speed to centrifugally extract liquid from the material contained therein, means for resiliently resisting movement of said bearing means transverse to said vertical axis whereby the receptacle may have a gyratory movement during extracting, said means being sufficiently resilient so that the receptacle will tend to assume a position at one side of said axis during washing, means for holding the receptacle in a central position during washing, said holding means being releasable during extracting, and friction damping means resisting said transverse movement of said bearing means.

7. In a combined washing and drying machine, a casing, a receptacle in the casing for receiving liquid and material to be washed, a vertical shaft extending upward from the bottom of the casing, means including said vertical shaft for effecting washing in the receptacle and for rotating the receptacle to extract liquid from the material contained therein, means including a bearing engaging said vertical shaft for resiliently supporting the shaft and receptacle for gyratory movement relative to the casing, friction damping means acting through a bearing for the vertical shaft for resisting the tilting movement of the vertical shaft whereby precession of the receptacle during extracting is prevented, a resilient mounting for supporting the machine on a floor or the like such that the natural frequencies of the vibration of the machine on the mounting is outside the frequencies of precession of the receptacle, and friction damping means for damping the vibration of the machine on said mounting, said damping means constructed so as to be substantially ineffective for small amplitudes of vibration.

8. In a combined washing and drying machine, a casing, a receptacle in the casing for receiving liquid and material to be washed, a vertical shaft extending upward from the bottom of the casing, means including a bearing engaging said vertical shaft for resiliently supporting the shaft and receptacle for gyratory movement relative to the casing, means including said vertical shaft for effecting washing in the receptacle and for rotating the receptacle at a speed above its critical speed to extract liquid from the material contained therein, friction damping means acting through a bearing for the vertical shaft for resisting the tilting movement of the vertical shaft whereby precession of the receptacle during extraction is prevented and a resilient mounting for supporting the machine on a floor or the like such that the natural frequencies of the vibration of the machine on the mounting is outside the frequencies of precession of the receptacle.

9. In a washing machine having a tub, a rotatable receptacle in the tub for receiving liquid and clothes to be washed, washing means in the receptacle, vertical shaft means extending upward from the bottom of the tube for selectively operating said washing means and for rotating the receptacle for centrifugal drying, means supporting the receptacle at the upper end of the shaft means, means for resiliently supporting the shaft means for tilting movement relative to the tub, and stabilizing means acting on a part in which the shaft means is journaled for decreasing the tendency of said receptacle to tilt during washing.

10. In a washing machine having a tub, a rotatable receptacle in the tub for receiving liquid and clothes to be washed, washing means in the receptacle, vertical shaft means extending upward from the bottom of the tube for selectively operating said washing means and for rotating the receptacle for centrifugal drying, means supporting the receptacle at the upper end of the shaft means, means for resiliently supporting the receptacle for tilting movement relative to the tub, and stabilizing means at the bottom of the tub for decreasing the tendency of the receptacle to tilt during washing comprising parts cooperating to hold the receptacle one of which is mounted on the bottom of the tub.

11. In a combined washing and drying machine, a receptacle for receiving liquid and material to be washed, bearing means in which the receptacle is journaled for rotation on a vertical axis, means for resiliently supporting the bearing means for gyratory movement about said vertical axis, friction damping means for resisting gyratory movement of said bearing whereby precession of the receptacle during extracting is prevented, means for effecting washing in the receptacle and for rotating the receptacle at a speed above its critical speed to extract liquid from the material contained therein, and means for resiliently supporting the machine on a floor or the like such that the natural frequency of the machine on said supporting means is outside the frequencies of precession of the receptacle.

12. In a laundry machine, a vertical shaft, a receptacle supported on and adapted to be rotated by said shaft, a sleeve in which said shaft is journaled, a member on said sleeve having a spherical surface and a flange projecting therefrom, cushioning members engaging said flange for resiliently resisting tilting of the sleeve and thereby resiliently centering the sleeve in an upright position, and friction members bearing on said spherical surface for resisting tilting of the sleeve and thereby preventing precession of the receptacle.

13. In combination, a rotatable clothes receptacle, a mounting for resiliently supporting the receptacle for gyratory movement, said resilient mounting having a critical speed well below the normal running speed of the receptacle, driving means for rotating the receptacle at a speed above said critical speed, a driving connection between the receptacle and said driving means permitting angular movement of the receptacle relative to said driving means, said driving connection including a universal joint comprising a flexible plate of material having a low internal friction, and friction damping means acting through a part in which the receptacle is journaled for frictionally resisting gyratory movement of the receptacle.

14. In combination, a rotatable clothes receptacle, a mounting for resiliently supporting the receptacle for gyratory movement, said resilient mounting having a critical speed well below the normal running speed of the receptacle, driving means for rotating the receptacle at a speed above said critical speed, a driving connection between the receptacle and said driving means permitting angular movement of the receptacle relative to said driving means, said driving connection including a universal joint of metal having a low internal friction and of the type in which relative angular movement is accompanied by flexing of the material of the joint, and friction damping means acting through a part in which the receptacle is journaled for frictionally resisting gyratory movement of the receptacle.

GEORGE W. DUNHAM.